US011019654B2

(12) United States Patent
Verma et al.

(10) Patent No.: US 11,019,654 B2
(45) Date of Patent: May 25, 2021

(54) LAA-LTE COMMUNICATION IN AN UNLICENSED SPECTRUM

(71) Applicant: Avago Technologies International Sales Pte. Limited, Singapore (SG)

(72) Inventors: Sindhu Verma, Bangalore (IN); Shubhodeep Adhikari, Bangalore (IN); Sharon Levy, Binyamina (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 140 days.

(21) Appl. No.: 16/506,303

(22) Filed: Jul. 9, 2019

(65) Prior Publication Data

US 2019/0335497 A1    Oct. 31, 2019

Related U.S. Application Data

(62) Division of application No. 15/909,575, filed on Mar. 1, 2018, now Pat. No. 10,383,144, which is a division
(Continued)

(30) Foreign Application Priority Data

Nov. 3, 2014  (IN) .......................... 5488/CHE/2014

(51) Int. Cl.
*H04W 74/00*  (2009.01)
*H04W 72/04*  (2009.01)
(Continued)

(52) U.S. Cl.
CPC ......... *H04W 74/002* (2013.01); *H04L 1/0026* (2013.01); *H04L 1/0027* (2013.01);
(Continued)

(58) Field of Classification Search
CPC .............. H04W 74/002; H04W 72/04; H04W 72/044; H04W 72/12; H04W 74/0816;
(Continued)

(56) References Cited

U.S. PATENT DOCUMENTS

| 2008/0232335 A1 | 9/2008 | Del Prado Pavon et al. |
| 2009/0122781 A1 | 5/2009 | Voglewede et al. |

(Continued)

FOREIGN PATENT DOCUMENTS

WO    WO-2016/046649    3/2016

OTHER PUBLICATIONS

Broadcom Corporation, Cablelabs, Deployment and Evaluation Considerations for LAA-LTE (R1-144234), Written Contribution at 3GPP Meeting, Ljubljana, Slovenia, Oct. 6-10, 2014, 2 pages.
Broadcom Corporation, Cablelabs, PHY enhancement areas & options to support robust coexistence LAA (R1-144233), Written Contribution at 3GPP Meeting, Ljubljana, Slovenia, Oct. 6-10, 2014, 3 pages.
(Continued)

*Primary Examiner* — Ashley Shivers
(74) *Attorney, Agent, or Firm* — Foley & Lardner LLP

(57) ABSTRACT

A method includes transmitting, at an access point configured to transmit data over an unlicensed band, a single message prior to transmitting data over a channel of the unlicensed band. The method further includes receiving, at the access point, a plurality of responses from a plurality of user equipment acknowledging the single message in response to the single message.

20 Claims, 5 Drawing Sheets

Related U.S. Application Data of application No. 14/925,756, filed on Oct. 28, 2015, now Pat. No. 9,918,336.

(51) Int. Cl.
*H04L 1/00* (2006.01)
*H04L 1/20* (2006.01)
*H04W 72/12* (2009.01)
*H04L 1/18* (2006.01)
*H04W 74/08* (2009.01)

(52) U.S. Cl.
CPC .......... *H04L 1/0073* (2013.01); *H04L 1/1887* (2013.01); *H04L 1/20* (2013.01); *H04W 72/04* (2013.01); *H04W 72/044* (2013.01); *H04W 72/12* (2013.01); *H04J 2211/001* (2013.01); *H04J 2211/005* (2013.01); *H04W 74/0816* (2013.01)

(58) Field of Classification Search
CPC ................ H04L 1/1887; H04L 1/0026; H04L 1/0073; H04L 1/20; H04L 1/0027; H04J 2211/001; H04J 2211/005
See application file for complete search history.

(56) References Cited

U.S. PATENT DOCUMENTS

| | | |
|---|---|---|
| 2013/0170427 A1 | 7/2013 | Gong et al. |
| 2013/0250931 A1 | 9/2013 | Abraham et al. |
| 2014/0341024 A1 | 11/2014 | Bhushan et al. |
| 2014/0341207 A1 | 11/2014 | Bhushan et al. |
| 2016/0066306 A1 | 3/2016 | Khawer et al. |
| 2016/0192306 A1 | 6/2016 | Ma et al. |
| 2017/0048041 A1* | 2/2017 | Yi .................. H04L 5/0048 |
| 2017/0086213 A1* | 3/2017 | Kalhan ............. H04W 72/0453 |
| 2017/0208475 A1* | 7/2017 | Yi .................. H04L 5/0053 |

OTHER PUBLICATIONS

Broadcom Corporation, Cablelabs, Robust-Coexistence Considerations for LAA-LTE (R1-144232), Written Contribution at 3GPP Meeting, Ljubljana, Slovenia, Oct. 6-10, 2014, 2 pages.

Ericsson et al., Study on Licensed-Assisted Access using LTE (RP-141664), Written Contribution at 3GPP Meeting, Edinburgh, Scotland, Sep. 9-12, 2014, 8 pages.

WI-FI Alliance, Wi-Fi Certified Voice-Enterprise: Delivering Wi-Fi voice to the enterprise, dated May 2012, 11 pages.

* cited by examiner

LAA-LTE COMMUNICATION IN AN UNLICENSED SPECTRUM

CROSS-REFERENCE TO RELATED APPLICATIONS

The present application is a Divisional of U.S. patent application Ser. No. 15/909,575, filed Mar. 1, 2018, which is a Divisional of U.S. patent application Ser. No. 14/925,756, filed Oct. 28, 2015, which claims priority to Indian Provisional Patent Application No. 5488/CHE/2014, filed Nov. 3, 2014, all of which are incorporated herein by reference in their entireties.

FIELD

The present disclosure relates generally to the field of networking, including, but not limited to, the use of Long-Term Evolution (LTE) in a small cell or access point.

BACKGROUND

Communications systems such as WiFi (802.11) and LAA-LTE (Licensed Assisted Access-LTE, also called LTE-U or unlicensed LTE) networks generally makes use of an unlicensed spectrum (i.e., a spectrum not reserved for a particular company, network, etc.). It is difficult to operate in the unlicensed spectrum, as interference in the unlicensed band can occur between various devices attempting to communicate.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
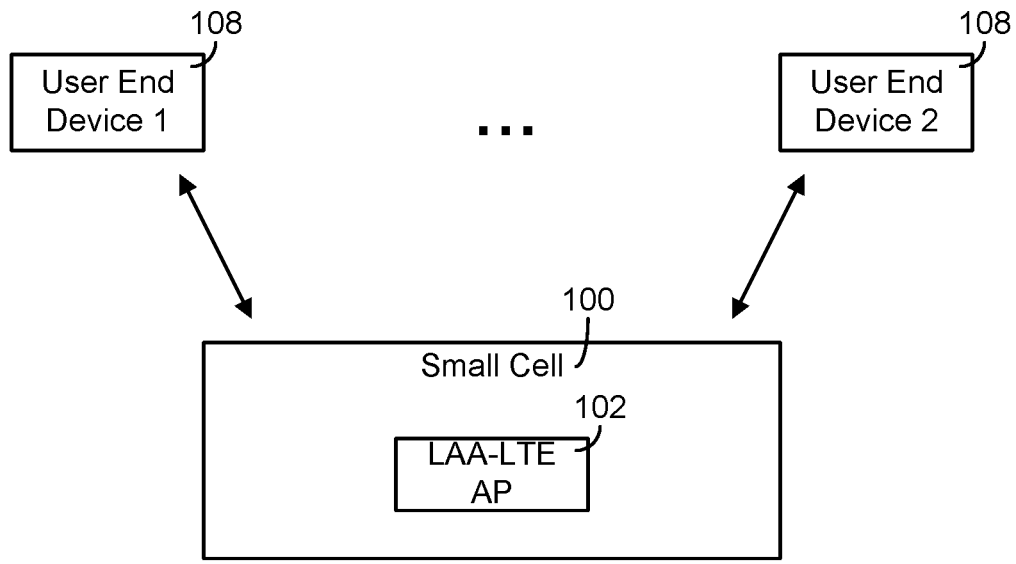
FIG. 1 is a block diagram of an environment including a small cell with LAA-LTE capability and a plurality of devices in communication with the small cell according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, various systems and methods for managing LTE communications between a plurality of LTE devices (e.g., one or more small cells and one or more user devices or user equipment (UEs)) communicating LTE signals with one another are shown and described. The communications occur over an unlicensed band or spectrum (e.g., a band not reserved for a particular company, network, etc.).

In some embodiments, a small cell sends a single multicast ready-to-send (RTS) signal to a number of user end devices in an environment. The user end devices then provide clear-to-send (CTS) signals in response to the RTS, indicating to the small cell that the devices are ready for transmission over the unlicensed spectrum. In some embodiments, the user end devices send the CTS signals over a closely spaced period of time.

In some embodiments, a LTE device in the environment estimates a quality metric associated with a signal sent over the unlicensed band. For example, a user end device receives at least one of a signal indicating an intent to transmit data, or a second signal acknowledging the first signal. The LTE device then estimates a quality metric associated with the signal. In some embodiments, the quality metric is a channel state information (CSI) or channel quality indication (CQI).

In some embodiments, LTE devices (e.g., small cells) in the environment manage potential interference in the unlicensed spectrum. For example, a first small cell receives a message indicating an intent to transmit data or a message acknowledging an indication of an intent to transmit data. The small cell determines if the message was transmitted by a second small cell, the second small cell coordinating transmissions with the first small cell. If so, the two small cells transmit signals during a same timeframe, coordinating transmissions with one another in some embodiments.

In some embodiments, a small cell determines a transmission window, at a future time, in which data is to be transmitted over the unlicensed band. The small cell transmits a message reserving the channel for transmission, beginning at the future time, and not blocking transmissions over the channel prior to the future time.

In some embodiments, a first small cell estimates a time offset between two transmission windows, the transmission windows being for transmission of data by the first small cell and a second small cell. The first small cell coordinates transmissions of the two small cells over the channel of the unlicensed band based on the time offset.

LAA-LTE (or LTE-U) is a standard for wireless communication that makes use of the unlicensed spectrum. In various exemplary embodiments of the present disclosure, the small cell is, or includes, a LAA-LTE access point facilitating use of the unlicensed spectrum (e.g., to avoid interference).

The present disclosure describes a small cell design integrating a LAA-LTE access point. In various other embodiments, the small cell design includes a LAA-LTE access point and one or more WiFi access points integrated within or coupled to the small cell to help facilitate use of the unlicensed spectrum (e.g., avoid interference with WiFi and/or other devices also utilizing the unlicensed spectrum).

In the present disclosure, the terms "user equipment" and "user end device" are used interchangeably, and "UE" is used as an abbreviation of the terms. Further, the terms "LAA-LTE AP", "LTE access point", "small cell", "LAA cell" and other like terms are used interchangeably.

The present disclosure describes small cells with LAA-LTE capability; in various embodiments, the systems and methods herein are implemented on one or more of any types of devices (e.g., user equipment, such as phones, handsets and/or handheld computers, laptops tablets, etc. and/or access points, such as devices similar to LTE eNodeB (eNB) devices) with capability for LAA-LTE communications in the unlicensed spectrum.

Figure 2:
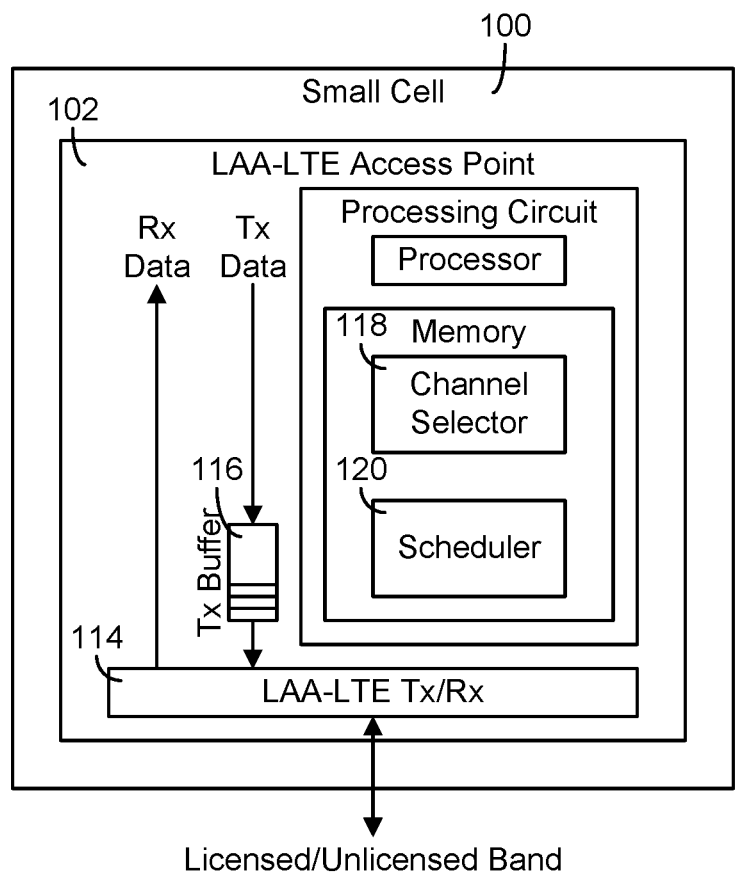
FIG. 2 is a more detailed block diagram of the small cell design of FIG. 1 according to an exemplary embodiment.

Referring to FIGS. 1-2, block diagrams of a small cell 100 design are shown, according to exemplary embodiments. As shown in FIG. 1, small cell 100 includes a LAA-LTE access point (AP) 102. In some embodiments, small cell 100 includes only LAA-LTE AP 102, and in other embodiments, small cell 100 includes one or more other components and/or devices (e.g., small cell 100 includes multiple LAA-LTE APs, includes one or more WiFi APs, etc.). In one implementation, small cell 100 includes a plurality of LAA-LTE APs. In one implementation, small cell 100 includes a LAA-LTE AP and a plurality of WiFi APs. It should be understood that the systems and methods described herein can be implemented for any embodiment of small cell 100 that includes any combination of LAA-LTE APs and WiFi APs. In particular, while the term "LAA-LTE AP" is used to describe an access point in the present disclosure, it should be understood that in other embodiments a WiFi AP can provide the same or similar functionality as described herein with reference to LAA-LTE APs.

Referring further to FIG. 1, small cell 100 is shown in communication with a number of devices 108 (e.g., user equipment or user end devices, other small cells including access points, and/or other devices). Small cell 100 is implementable in an environment such as an office, commercial or residential building, school, or any other type of environment in which devices connect wirelessly. Small cell 100 communicates with the various devices 108 over a network that incorporates one or more of a variety of communication methods or protocols. For example, some devices 108 communicate with small cell 100 via LAA-LTE. In some embodiments, some devices 108 communicate with small cell 100 via WiFi (e.g., 802.11n, 802.11ac, 802.11ax, 802.11ad, etc.).

Referring more specifically to FIG. 2, an example embodiment of small cell 100 is shown. Small cell 100 includes a LAA-LTE AP 102; again, in other embodiments, small cell 100 includes multiple access points and/or include one or both of LAA-LTE APs and WiFi APs. LAA-LTE AP 102 is shown to generally include a transmitter/receiver circuit 114 for transmitting and receiving data, and a buffer 116 for data to be transmitted. In some embodiments, LAA-LTE AP 102 further includes a UART-based general circuit interface (GCI), and a peripheral component interconnect express (PCIe) interface for communication with other modules within small cell 100.

LAA-LTE AP 102 is further shown to include a processing circuit including a processor and memory. The memory is shown to include channel selector 118 and scheduler 120. In some embodiments, the memory further includes other modules for controlling the activities of the access point. In some embodiments, the processor is, or includes, one or more microprocessors, application specific integrated circuits (ASICs), circuits containing one or more processing components, a group of distributed processing components, circuitry for supporting a microprocessor, or other hardware for processing. The processor executes computer code stored in memory to complete and facilitate the activities described herein. The memory is any volatile or non-volatile computer-readable storage medium capable of storing data or computer code relating to the activities described herein. For example, the memory is shown to include modules which are computer code modules (e.g., executable code, object code, source code, script code, machine code, etc.) for execution by the processor. According to some embodiments, the processing circuits represent a collection of processing devices (e.g., servers, data centers, etc.). In such cases, the processor represents the collective processors of the devices and the memory represents the collective storage devices of the devices. The processing circuit completes the activities described herein by executing software instructions stored in the memories in some embodiments. In some embodiments, channel selector 118 and/or scheduler 120 are implemented outside of the memory (e.g., using hardware-based circuitry).

Channel selector 118 selects a channel for communications for small cell 100. When multiple devices (e.g., LAA-LTE devices, or an LAA-LTE device and one or more WiFi APs/devices) operate on the same unlicensed band, the devices can cause co-channel interference and data collision. In some embodiments, channel selector 118 scans for neighboring LAA-LTE APs and WiFi APs that could cause interference. Channel selector 118 works in conjunction to determine the current channel allocation for the RF environment, in some embodiments. Scheduler 120 schedules transmissions by LAA-LTE AP 102.

Figure 3:
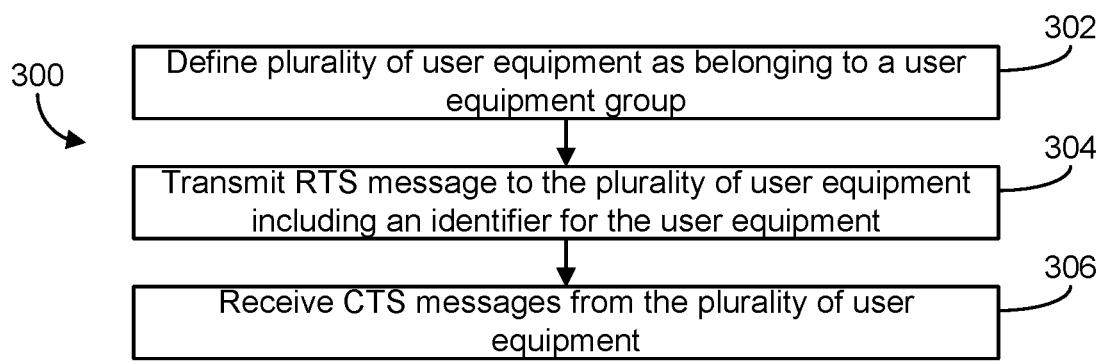
FIG. 3 is a flow chart of a flow for reducing channel reservation overhead in an unlicensed spectrum of the environment according to an exemplary embodiment.

Referring now to FIG. 3, a flow chart of a flow 300 of operations for reducing channel reservation overhead in an unlicensed spectrum is shown, according to an exemplary embodiment. The activities of flow 300 allow a LAA-LTE AP (or a WiFi AP) to transmit a message to one or more other devices, such as UEs and/or other access points. In some embodiments, the message indicates an intent to transmit over one or more channels of the unlicensed band. In some embodiments, the LAA-LTE AP receives a response message from two or more of the recipient devices of the first message acknowledging receipt of the first message and/or indicating that the recipient devices will not transmit on the channel for at least a period of time to avoid interference with the transmission. For example, in some embodiments, the message is a RTS signal, and the LAA-LTE AP receives CTS signals from the devices (e.g., UE devices) to which the RTS message is directed in response to the RTS signal. While the embodiments below discuss the transmission of RTS and CTS messages/signals, in other embodiments, other types of messages/signals are transmitted.

In some embodiments, a LAA-LTE AP transmits a RTS message that addresses a single user end device. The user end device generates a response (e.g., the CTS signal) that also informs the hidden nodes in the environment in the vicinity of the user end device of the intent of the LAA-LTE AP to transmit on the unlicensed band channel.

In one exemplary embodiment of FIG. 3, the LAA-LTE uses an orthogonal frequency-division multiple access (OFDMA) scheme. In some embodiments, the OFDMA scheme is used to provide compatibility of the LAA-LTE AP with LTE and enable spectral efficiency and capacity gains from multi-user diversity, multi-carrier scheduling. Further enhanced Inter-Cell Interference Coordination (FeICIC), etc. In some embodiments, a single LAA burst (e.g., a single RTS message) is transmitted to multiple recipient devices (e.g., the LAA-LTE AP and/or UE devices). In some embodiments, each resource block pair in the message is addressed to a different user end device. Because of the coexistence of WiFi in the environment, reserving bandwidth in the unlicensed channel is desirable for the LAA-LTE AP in order to communicate with multiple user end devices, in some embodiments. For example, if the time taken to reserve a channel for LAA transmission increases, the probability of being able to successfully reserve a channel decreases, and/or WiFi transmissions are delayed and/or lost as less time is left in the channel for WiFi transmissions.

In some embodiments, to support OFDMA, instead of using multiple RTS/CTS exchanges, flow 300 utilizes a single multicast RTS. The single multicast RTS message is used with closely spaced CTS signals sent by the user end devices to minimize channel access delay and reduce channel reservation overhead.

Flow 300 includes, at a LAA-LTE AP, defining a plurality of UEs as belonging to a UE group (operation 302). In some embodiments, operation 302 includes setting up the groups semi-statically through radio resource control (RRC) messaging. In such an embodiment, each UE is assigned a group and assigned an index. In some embodiments, the identifier for a group of UEs is a unique virtual MAC address. The index indicates the order in which the UEs in the group would transmit CTS messages, one after the other (e.g., sequentially). In some embodiments, a UE can be a part of a single group or multiple groups.

In another embodiment, at operation 302, a RTS signal sent by the LAA-LTE AP (at operation 304) is extended in a backwards compatible manner such that there are additional fields in the RTS signal to identify the addressed UEs and the order in which the UEs should transmit the closely-spaced CTSs.

Flow 300 further includes, at the LAA-LTE AP, transmitting a message (e.g., a RTS message) to two or more devices (e.g., user end devices) (operation 304). In some embodiments, the RTS message includes an identifier or additional fields to identify the addressed UEs. Flow 300 further includes, at the LAA-LTE AP, receiving response messages (e.g., CTS messages) from two or more of the devices acknowledging the message from the LAA-LTE AP (operation 306). In some embodiments, the CTS messages are received in a known sequence, and includes an identifier for the LAA-LTE AP to identify which CTS message belongs to which UE.

The UEs that send the CTS later have an increasing probability of collision, as they could send the CTS after a hidden node which has missed the RTS or previous CTS messages.

In some embodiments, the sequence of transmissions of the UEs (i.e., the sequence in which the UEs transmit CTS messages to the LAA-LTE AP) is decided based on a knowledge of interfering hidden nodes in the neighborhood of the UEs. The knowledge is based on location and transmit power data or through a history of failed RTS attempts with a UE due to another UE preempting the CTS message, in some embodiments.

In some embodiments, if the LAA-LTE AP does not receive a CTS for some UEs addressed in the RTS, it can schedule transmissions only to the UEs from which it received a CTS. Therefore, in some embodiments, in the case of CTSs colliding with transmissions from hidden nodes, only the part of the multicast RTS/CTS exchange impacted by the hidden node becomes ineffective, and transmission occurs with the other UEs.

In some embodiments, if the CTSs from the UEs are enhanced to transmit in a OFDMA manner, the time spacing between the CTSs is avoided to further reduce delay in the process.

Figure 4:
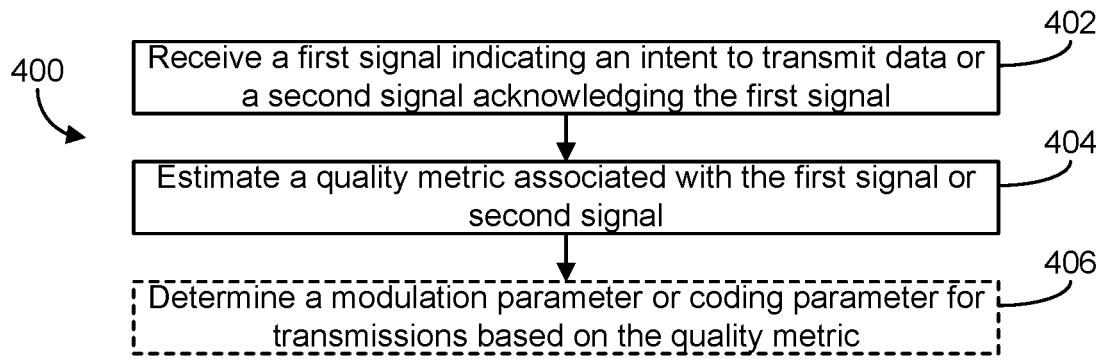
FIG. 4 is a flow chart of a flow for estimating a quality metric associated with a signal sent over the unlicensed spectrum by an access point according to an exemplary embodiment.

Referring now to FIG. 4, a flow chart of a flow 400 of operations for estimating a quality metric associated with a signal sent over the unlicensed spectrum by an access point is shown, according to an exemplary embodiment. Flow 400 is executed by, for example, either the LAA-LTE AP or a user end device to determine channel characteristics for transmissions in the unlicensed band.

LAA bursts occur discontinuously in time. Therefore, in some instances, the LAA-LTE AP does not know the recent channel state at a user end device when transmission to the user end device begins at the initial phases of the LAA burst. In some embodiments, the user end device measures the channel during the LAA burst and reports back a CSI metric to the LAA-LTE AP. The LAA-LTE AP would then select a modulation and coding scheme (MCS). However, the LAA-LTE AP can use a conservative MCS to avoid errors. Process 400 is executed by the LAA-LTE AP to select appropriate modulation and/or encoding parameters (e.g., select a MCS). In some embodiments, process 400 is used to select MCS parameters prior to a first LAA burst. In some embodiments, process 400 is executed to estimate the CSI (or another quality metric) from RTS and/or CTS messages. In some embodiments, flow 400 is used to estimate a propagation delay and/or distance between an access point and user end devices based on a time difference between a first message (e.g., RTS message) and a second message (e.g., CTS message).

Flow 400 includes receiving a signal at the UE (operation 402). In some embodiments, the signal is a first signal indicating an intent to transmit data on a channel of an unlicensed band. In other embodiments, the signal is a second signal acknowledging the first signal indicating an intent to transmit data on the channel. In some embodiments, the first signal is a RTS message, and the second signal is a CTS message. In some embodiments, the CTS message includes an intended recipient identifier (e.g., MAC address) corresponding to the LAA-LTE AP that transmitted the RTS message triggering the CTS message. In some embodiments, the CTS message includes an intended recipient identifier corresponding to the node (e.g., UE) transmitting the CTS message (e.g., a CTS-to-self message). In some embodiments, the CTS message (e.g., CTS-to-nowhere message or CTS2NW) includes an intended recipient identifier that does not correspond to a known recipient node (e.g., an identifier or address indicating to one or more other nodes or devices that the message is intended as a broadcast message).

Process 400 further includes estimating a quality metric associated with the first signal or second signal (operation 404). In some embodiments, estimation of the quality metric is based at least in part on a noise metric (e.g., signal-to-noise ratio) of the measured signal. The estimation of the quality metric could occur at either a LAA-LTE AP or at an user end device, or a combination thereof. In some embodiments, the quality metric is part or all of CSI from the user end device. In some embodiments, the quality metric is a CQI metric. In other embodiments, any other quality metric, or combination of quality metrics are used.

In some embodiments, the first signal is a RTS message and is used to estimate the quality metric. When the RTS message is measured, a CSI metric is fed back to the LAA-LTE AP either through a corresponding CTS or a licensed LTE uplink, in some embodiments.

In some embodiments, the second signal is a CTS message (e.g., a CTS-to-nowhere or CTS2NW message) and is used to estimate the quality metric. When the CTS message is measured, a CSI metric is fed back to the LAA-LTE AP through the licensed LTE uplink, in some embodiments.

In various embodiments, operation 404 is executed for any of various types of messages (e.g., RTS and/or CTS messages).

Flow 400 optionally includes determining a parameter for transmissions on the channel based on the quality metric (operation 406). For example, operation 406 includes determining a modulation parameter and/or a coding parameter (e.g., MCS). The parameter(s) is determined prior to transmission of a first data burst on the channel by the LTE access point, in some embodiments. The parameter is used to enable use of an improved MCS in transmissions at the beginning of a LAA burst, in some embodiments.

In some embodiments, the quality metric includes an indication which allows for selective scheduling. For example, if a first user end device has a better channel at high frequency (e.g., better transmission capability at a high frequency than a low frequency) and a second user end device has a better channel at low frequency, the quality metric indicates a preference for transmitting data to, for example, the first user end device at the higher frequencies.

Figure 5:
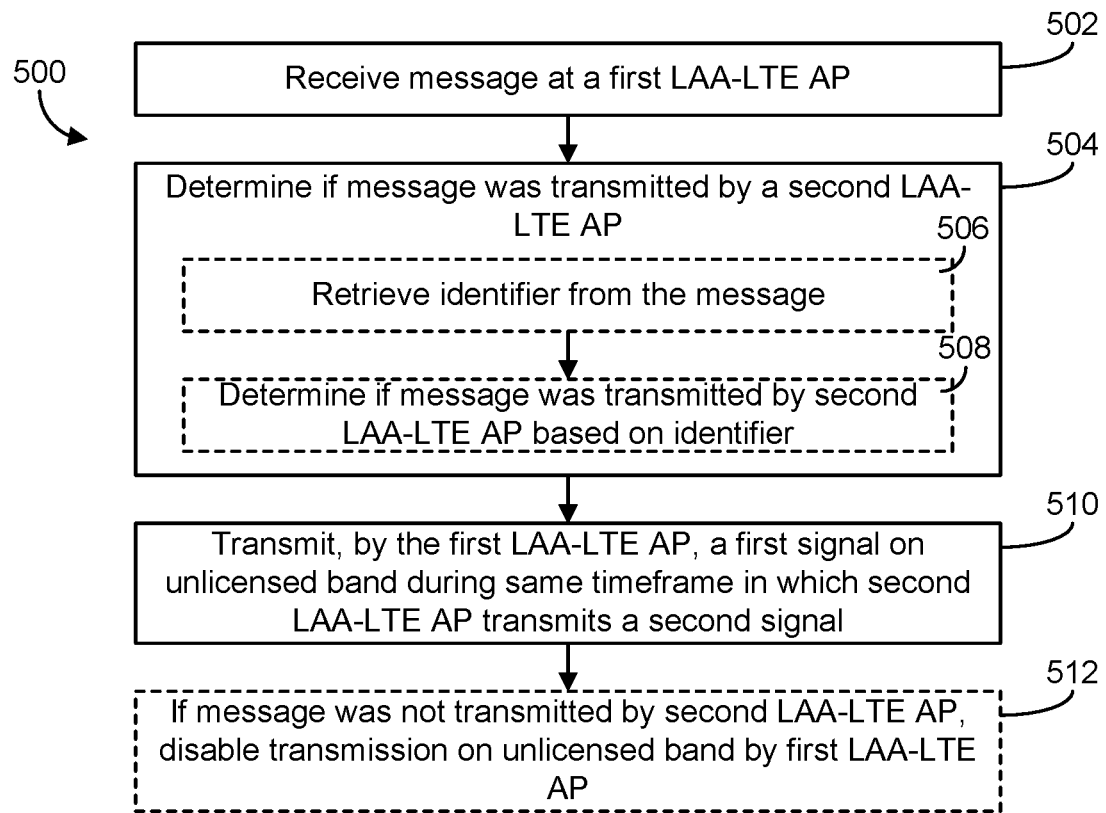
FIG. 5 is a flow chart of a flow for managing interference in the unlicensed spectrum to allow multiple small cells to transmit in the unlicensed spectrum according to an exemplary embodiment.

Referring now to FIG. 5, a flow chart of a flow 500 of operations for managing interference in the unlicensed spectrum is shown according to an exemplary embodiment. The interference is managed to allow multiple small cells in the environment to transmit in the unlicensed spectrum.

A LAA-LTE AP handles strong downlink interference scenarios (e.g., through the use of FeICIC and OFDMA). Therefore, in some embodiments, groups of LAA-LTE enabled cells coordinate their access time instants and access durations on the unlicensed spectrum, at least for intra-operator LAA-LTE deployments. The cells among such a group that transmit on the downlink on the same subframe improve their mutual interference via semi-static or dynamic interference coordination techniques, in some embodiments. In effect, the downlink transmit power, the selected MCSs and the UEs to which the allocations are made are adjusted per resource block of the LAA subframe so that interference from other cells in the environment is managed.

If a cell uses a RTS/CTS or CTS2NW scheme to gain access to the unlicensed spectrum, another cell could back off from channel access, even though internally, both cells are coordinated and scheduled for transmission on possibly overlapping time intervals. Therefore, the RTS/CTS method can be enhanced to distinguish between messages from neighboring cells who are internally coordinated in time and frequency and messages from uncoordinated entities, such as WiFi nodes. This allows for cells to transmit at overlapping time instants with a resultant increase in spectral efficiency, in some embodiments.

Flow 500 includes receiving a message at a first LAA-LTE AP (operation 502). In some embodiments, the message is a first message indicating an intent to transmit data on a channel of an unlicensed band. In some embodiments, the message is a second message acknowledging the first message. In some embodiments, the first message is a RTS message, and the second message is a CTS message. The CTS message can be a CTS-to-nowhere message, a CTS-to-self message, a CTS message for another device, or another type of CTS message.

Flow 500 further includes determining if the message was transmitted by a second LAA-LTE AP (operation 504). The second LAA-LTE AP coordinates transmissions with the first LAA-LTE AP.

In some embodiments, the LAA-LTE AP determines the source of the message. For example, flow 500 optionally includes retrieving an identifier from the message (operation 506) and determining if the message was transmitted by the second LAA-LTE AP based on the identifier (operation 508).

Flow 500 further includes transmitting, by the first LAA-LTE AP, a first signal on the unlicensed band during a same timeframe in which the second LAA-LTE AP transmits a second signal on the unlicensed band (operation 510). The transmission is based on determining the message was transmitted by the second LAA-LTE AP at operation 504. If the message was not transmitted by the second LAA-LTE AP, flow 500 includes disabling transmission on the unlicensed band during the timeframe by the first LAA-LTE AP, in some embodiments (operation 512).

In some embodiments, the coordination as described in flow 500 is assisted by the WiFi APs integrated in the small cells with the LAA-LTE AP. This coordination is performed based on transmit power, downlink rate adjustment, and/or frequency reuse, in various embodiments. In some embodiments, part or all of flow 500 is executed in the WiFi AP.

Figure 6:
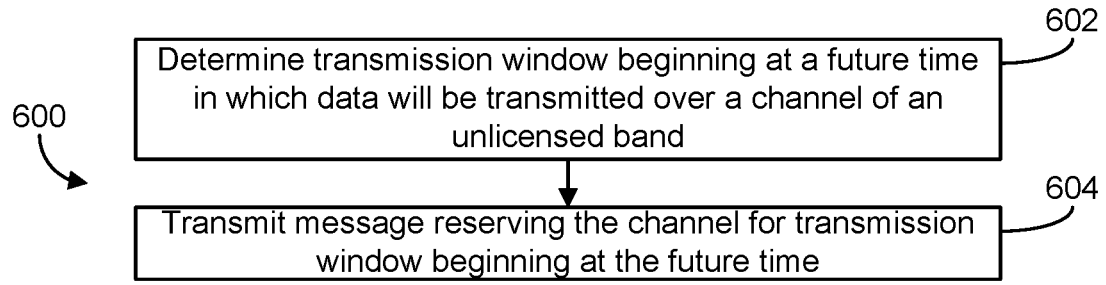
FIG. 6 is a flow chart of a flow for reserving a channel in the unlicensed spectrum for a future transmission window according to an exemplary embodiment.

Referring now to FIG. 6, a flow chart of a flow 600 of operations for reserving a channel in the unlicensed spectrum for a future transmission is shown, according to an exemplary embodiment. Flow 600 allows for the reserving of discontinuous time intervals in the unlicensed band, reducing the wastage of bandwidth in the channel. Flow 600 is used in scenarios where the LAA-LTE AP knows a response from another device in an environment will occur at a fixed future time, in some embodiments.

In some embodiments, a RTS/CTS procedure of a WiFi node only reserves continuous time intervals, which can prevent good channel reservation for the small cell. For example, in one scenario, a hybrid automatic repeat request (hybrid ARQ or HARQ) transmission of the node occurs a short time (e.g., 4 ms) after the corresponding downlink transmission. The HARQ message has a fixed time offset to the downlink transmission and has a lag of, for example, 4 ms, in some embodiments.

This would result in the RTS/CTS channel reservation procedure requesting a reservation of 4 ms (3 ms time gap plus 1 ms for the HARQ transmission) of additional time to accommodate the transmission of HARQ, in some embodiments. No other transmission is then scheduled on the intervening 3 ms, or if this is the last downlink transmission in the LAA burst, the 3 ms of reserved time is wasted. Two separate channel reservation requests, one or the downlink transmission and one for the HARQ transmission, are not made. Due to the uncertain nature of channel reservation in the unlicensed band, two separate and independent channel reservation requests do not reliably reserve the channel at the fixed (e.g., 3 ms) time offset.

A WiFi node does not encounter the channel wastage problem, as the ARQ is transmitted briefly (e.g., 16 us, for 802.11 n at 5 GHz) after the corresponding data transmission. The WiFi node reserving continuous time to accommodate ARQ transmission does not cause any significant resource wastage in contrast to LTE (e.g., 16 us versus 3 ms).

Referring to FIG. 6, a process is described wherein messages are used to reserve a transmission window at a future time within an unlicensed band. For example, in some embodiments, the RTS/CTS procedure is updated to request channel reservation for one or more future times, allowing a gap between transmissions occurring in discontinuous time intervals instead of reserving an entire continuous time interval for the multiple transmissions. A RTS/CTS procedure is executed at a time t, to reserve the channel at time intervals [t+δ1, t+δ2], [t+δ3, t+δ4], etc., where $0 \leq \delta 1 < \delta 2 < \delta 3 < \delta 4$. . . , in some embodiments.

Flow 600 is shown to include, at a LAA-LTE AP, determining a transmission window beginning at a future time in which data will be transmitted over a channel of an unlicensed band (operation 602). In some embodiments, the future time is a predetermined time after a transmission of the LAA-LTE AP. Process 600 further includes transmitting a message reserving the channel for transmission for the transmission window beginning at the future time (operation 604). The transmission at the future time does not block transmissions over the channel prior to the future time. The single channel reservation request reserves the channel until Transmission Time Interval (TTI) n for the downlink transmission and again for TTI n+4 for the HARQ transmission, in some exemplary embodiments. This saves potential channel wastage (e.g., of 3 ms).

In some embodiments, the message transmitted at operation 604 is a RTS message indicating that the LAA-LTE AP is ready to send a message to one or more user end devices. The devices in the environment proceed as described in the present disclosure.

Figure 7:
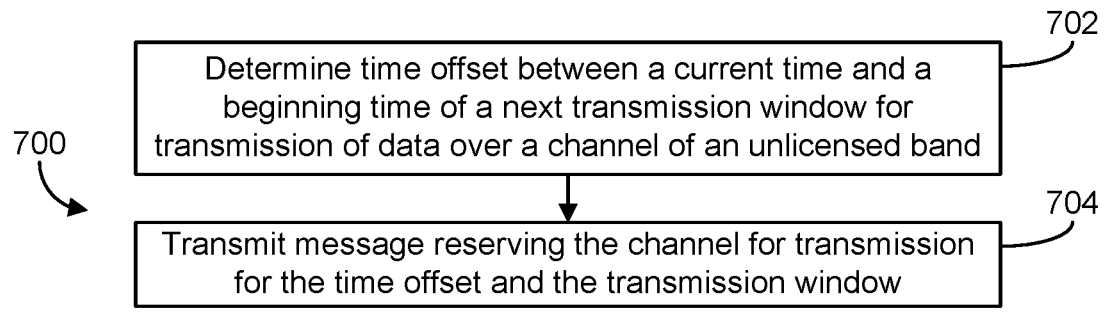
FIG. 7 is a flow chart of another flow for reserving a channel in the unlicensed spectrum for a future transmission window according to an exemplary embodiment.

Referring to FIG. 7, a flow chart of another flow 700 of operations for reserving a channel in the unlicensed spectrum for a future transmission is shown, according to an exemplary embodiment. In the embodiment of FIG. 6, if a LAA burst length is an integer number of LTE subframes, then restricting LAA subframes to maintain time synchronization with subframes of a previous burst or with the subframes of the LTE cell in the licensed band would make LAA waste, for example, 1 ms in each burst. Flow 700 reduces the average bandwidth wastage to, for example, 0.5 ms per burst by using a time offset, in some embodiments.

Flow 700 includes determining a time offset between a current time and a beginning time of a next transmission window for transmission of data over a channel of an unlicensed band (operation 702). Flow 700 further includes transmitting a message reserving the channel for transmission for the time offset and the transmission window (operation 704). In other words, the scheduler of the LAA-LTE AP requests the channel access for a duration equal to an integer number of TTIs plus the time offset difference.

Figure 8:
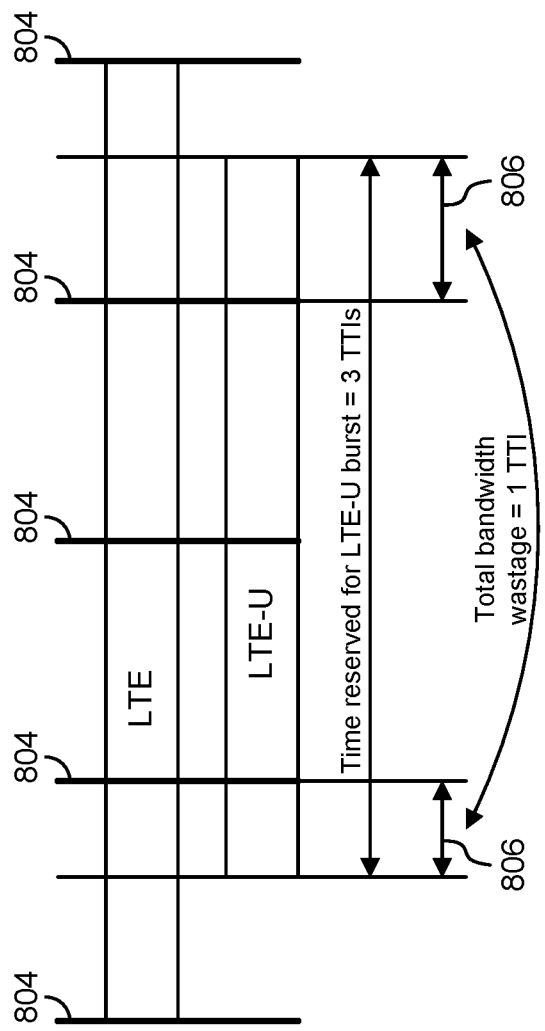
FIG. 8 illustrates the channel reservation flow of FIG. 7 compared to a typical channel reservation flow according to an exemplary embodiment.
Figure 8:
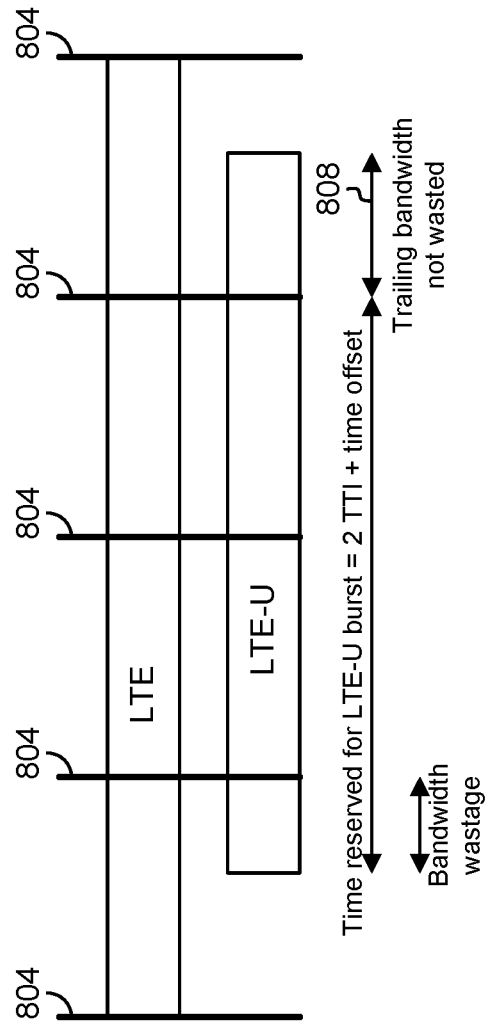

Referring also to FIG. 8 the channel reservation process of FIG. 7 is illustrated and compared to a less efficient channel reservation process. In a less efficient channel reservation process (labeled as 802 in FIG. 8), the channel is shown reserved for a LAA burst of 3 TTIs. The channel is shown to include a number of LTE TTI boundaries 804, each boundary indicating the start of a new transmission window. The channel is reserved for 3 TTIs, but bandwidth is wasted at times 806, at each end of the reservation, for a total of 1 TTI.

In flow 700, while requesting channel access, the LAA-LTE AP determines the time offset difference between the start time of the requested burst and the start of the LTE TTI. Therefore, the channel is reserved for a LAA burst for a time of 2 TTIs plus the time offset, instead of 3 TTIs. This results in avoiding wasting the trailing bandwidth 808.

Figure 9:
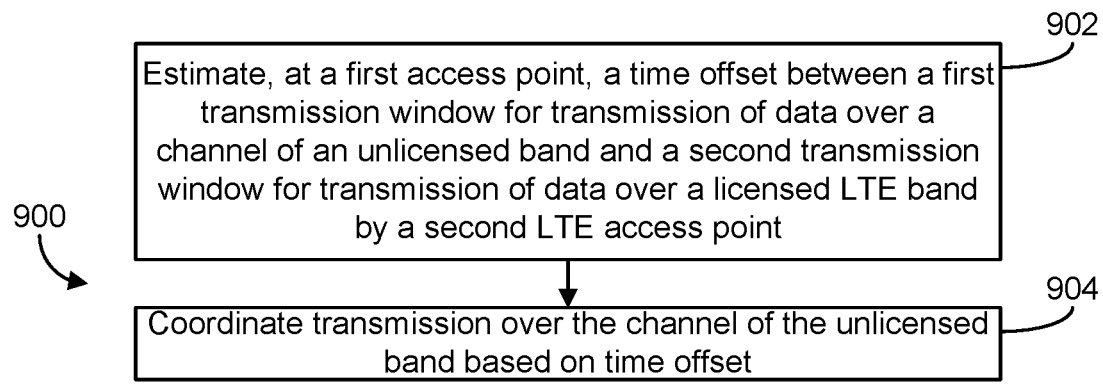
FIG. 9 is a flow chart of a flow for estimating a time offset between transmission windows in the unlicensed spectrum according to an exemplary embodiment.

Referring now to FIG. 9, a flow chart of a flow 900 of operations for estimating a time offset between transmission windows in the unlicensed spectrum is shown, according to an exemplary embodiment. Flow 900 is executed to coordinate transmission between two or more LAA-LTE APs in an environment. The transmissions are coordinated based on a time offset between transmission windows of each LAA-LTE AP.

LAA bursts are discontinuous in time, and, in some embodiments, time intervals that can be used by a LAA cell cannot be deterministically known in advance, as described above. Therefore, channel access times for a small cell are not naturally time aligned with a transmission from a corresponding LTE cell.

One process for aligning the transmission is illustrated in FIG. 8. For example, as shown in FIG. 8, 1 TTI of bandwidth is wasted, corresponding to 1 ms of channel reservation time. In the presence of multiple other contenders for the channel, a LAA transmission interval is expected to be within, for example, 5 ms to 20 ms. The resulting wasted transmission opportunity due to TTI alignment would then be between 5%-20%.

As described in FIGS. 6-8, one scheme to prevent the wastage would be to allow LAA TTIs to not necessarily be time aligned with the LTE TTIs and to be able to start at time offsets independent of LTE. To aid this, further procedures as described in FIG. 9 are used to enable a user end device in the environment to make the timing estimation.

Flow 900 includes estimating, at a first LAA-LTE AP, a time offset between a first transmission window for transmission of data over a channel of an unlicensed band and a second transmission window for transmission of data over a licensed LTE band by a second LAA-LTE AP (operation 902). Process 900 further includes coordinating transmission over the channel of the unlicensed band based on the time offset (operation 904).

In some embodiments, estimating the time offset includes determining a difference between a first time and a second time. The first time is a time at which a first message or second message is received. The first message indicates an intent to transmit data on a channel of the unlicensed band and the second message acknowledges the first message, in some embodiments.

In some embodiments, the first and second transmission windows correspond to, for example, a RTS/CTS exchange between small cells. Flow 900 helps ensure that LAA bursts start at a fixed time offset from a corresponding RTS/CTS exchange, in some embodiments. The LAA timing is derived from the CTS message (e.g., a CTS2-to-nowhere or another type of CTS message), in some embodiments.

In some embodiments, before sending the LAA-LTE burst, a training sequence is used. The training sequence identifies when the timing of the burst will occur. In some embodiments, such a sequence is generated and/or transmitted by the robust coexistence coordinator (RCC). The training sequence includes, for example, a sequence of data in a predetermined format and/or having a predetermined timing pattern.

Various embodiments of the present disclosure may be used for transmissions in an unlicensed spectrum by equipment WiFi equipment, LTE equipment, or equipment including both WiFi and LTE features. For example, in some implementations, multicast messages (e.g., RTS/CTS messages) may be used to schedule communications between WiFi access points and/or user equipment. A multicast RTS/CTS scheme, as described above, may be used instead of the unicast RTS/CTS scheme of legacy WiFi. Multicasting may reduce channel reservation time for a multi-STA transmission. This may be used, for example, in conjunction with 802.11ax, 802.11ad, and/or other WiFi standards, in various implementations.

Embodiments of the disclosure are described in the general context of method steps which are implemented in some embodiments by a program product including machine-executable instructions, such as program code, for example, in the form of program modules executed by machines in networked environments.

It should be noted that although the flowcharts provided herein show a specific order of method steps, it is understood that the order of these steps can differ from what is depicted. Also two or more steps can be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or can be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
   receiving, at a first access point over an unlicensed band, at least one of a first message indicating an intent to transmit data on a channel of the unlicensed band or a second message acknowledging the first message;
   determining whether the at least one of the first message or second message was transmitted by a second access point configured to coordinate transmissions with the first access point; and
   transmitting, by the first access point, a first signal on the unlicensed band during a same timeframe in which the second access point transmits a second signal on the unlicensed band based on determining the at least one of the first message or the second message was transmitted by the second access point.

2. The method of claim 1, wherein the first message comprises a Ready to Send (RTS) message, and wherein the second message comprises a Clear to Send (CTS) message.

3. The method of claim 1, further comprising disabling transmission on the unlicensed band during the timeframe by the first access point based on determining the at least one of the first message or the second message was not transmitted by the second access point.

4. The method of claim 1, wherein determining whether the at least one of the first message or second message was transmitted by a second access point comprises:
   retrieving an identifier from the at least one of the first message or the second message; and
   determining whether the at least one of the first message or the second message was transmitted by the second access point based on the identifier.

5. The method of claim 1, wherein the first access point and second access point each comprise one of a Long Term Evolution (LTE) access point, a WiFi access point, or a hybrid access point including LTE and WiFi components.

6. A method comprising:
   determining at a first access point whether at least one of a first message or second message was transmitted by a second access point configured to coordinate transmissions with the first access point on an unlicensed band; and
   transmitting, by the first access point, a first signal on the unlicensed band during a same timeframe in which the second access point transmits a second signal on the unlicensed band based on determining the at least one of the first message or the second message was transmitted by the second access point.

7. The method of claim 6, wherein the second message comprises a Clear to Send (CTS) message.

8. The method of claim 6, wherein the first message comprises a Ready to Send (RTS) message.

9. The method of claim 6, further comprising disabling transmission on the unlicensed band during the timeframe by the first access point based on determining the at least one of the first message or the second message was not transmitted by the second access point.

10. The method of claim 6, wherein determining whether the at least one of the first message or second message was transmitted by a second access point comprises:
    retrieving an identifier from the at least one of the first message or the second message; and
    determining whether the at least one of the first message or the second message was transmitted by the second access point based on the identifier.

11. The method of claim 6, wherein the first access point and second access point each comprise one of a Long Term Evolution (LTE) access point, a WiFi access point, or a hybrid access point including LTE and WiFi components.

12. The method of claim 6, wherein the first access point and second access point each comprise a Long Term Evolution (LTE) access point.

13. The method of claim 6, wherein the first access point and second access point each comprise a WiFi access point.

14. The method of claim 6, wherein the first access point and second access point each comprise a hybrid access point including LTE and WiFi components.

15. An apparatus configured to transmit data over an unlicensed band, the apparatus comprising circuitry configured to:
    receive over the unlicensed band at least one of a first message indicating an intent to transmit data on a channel of the unlicensed band or a second message acknowledging the first message;
    determine whether the at least one of the first message or second message was transmitted by an access point configured to coordinate transmissions with the apparatus; and
    transmit, a first signal on the unlicensed band during a same timeframe in which the access point transmits a second signal on the unlicensed band based on determining the at least one of the first message or the second message was transmitted by the access point.

16. The apparatus of claim 15, wherein the circuitry is configured to:
    disable transmission on the unlicensed band during the same timeframe if the first message was not transmitted by the access point.

17. The apparatus of claim 15, wherein the first message comprises a Ready to Send (RTS) message, and wherein the second message comprises a Clear to Send (CTS) message.

18. The apparatus of claim 15, wherein determining whether the at least one of the first message or second message was transmitted by the access point comprises:
    retrieving an identifier from the at least one of the first message or the second message; and
    determining whether the at least one of the first message or the second message was transmitted by the access point based on the identifier.

19. The apparatus of claim 15, wherein the apparatus comprises one of a Long Term Evolution (LTE) access point, a WiFi access point, or a hybrid access point including LTE and WiFi components.

20. The apparatus of claim 15, wherein the apparatus is a hybrid access point including LTE and WiFi components.

\* \* \* \* \*